United States Patent
Srikanth et al.

(10) Patent No.: US 8,260,863 B2
(45) Date of Patent: Sep. 4, 2012

(54) SYSTEM AND METHOD FOR CLIENT-SIDE INTERRUPTION MANAGEMENT

(75) Inventors: Hema Srikanth, Raleigh, NC (US); Patrick Joseph O'Sullivan, Ballsbridge (IE); Brian Douglas Gallagher, West Newton, MA (US); Robert James Mullin, Hollis, NH (US)

(73) Assignee: International Business Machines Corporation, Armonk, NY (US)

( * ) Notice: Subject to any disclaimer, the term of this patent is extended or adjusted under 35 U.S.C. 154(b) by 351 days.

(21) Appl. No.: 11/967,753

(22) Filed: Dec. 31, 2007

(65) Prior Publication Data

US 2009/0172113 A1 Jul. 2, 2009

(51) Int. Cl.
*G06F 15/16* (2006.01)
(52) U.S. Cl. ......... 709/206; 709/203; 709/207; 709/220
(58) Field of Classification Search .......... 709/202–207, 709/220–226
See application file for complete search history.

(56) References Cited

U.S. PATENT DOCUMENTS

| 7,272,633 | B2* | 9/2007 | Malik et al. ................. 709/206 |
| 7,313,617 | B2* | 12/2007 | Malik et al. ................. 709/206 |
| 7,443,971 | B2* | 10/2008 | Bear et al. ................ 379/210.01 |
| 7,769,039 | B2 | 8/2010 | Oral et al. |
| 7,890,595 | B2* | 2/2011 | Haynes et al. ............... 709/206 |
| 8,136,125 | B2* | 3/2012 | Beadle et al. ................ 709/207 |
| 2004/0181579 | A1* | 9/2004 | Huck et al. ................... 709/205 |
| 2005/0132011 | A1 | 6/2005 | Muller et al. |
| 2006/0242246 | A1 | 10/2006 | Lyle et al. |
| 2009/0030988 | A1* | 1/2009 | Kuhlke et al. ................. 709/206 |
| 2009/0228801 | A1* | 9/2009 | Lee et al. ...................... 715/730 |

* cited by examiner

*Primary Examiner* — Bharat N Barot
(74) *Attorney, Agent, or Firm* — Holland & Knight LLP; Brian J. Colandreo, Esq.; V. Raman Bharatula, Esq.

(57) ABSTRACT

A method and computer program product for determining that a user of a client electronic device is in do-not-interrupt mode. A message directed to the user is routed to a client-based storage queue for subsequent delivery.

20 Claims, 4 Drawing Sheets

SYSTEM AND METHOD FOR CLIENT-SIDE INTERRUPTION MANAGEMENT

TECHNICAL FIELD

This disclosure relates to interruption management and, more particularly, to multi-modal interruption management.

BACKGROUND

The electronic workplace today is continuously changing by allowing employees to collaborate and have team meetings in various ways, including instant messaging and web conferencing. Instant messaging has become and will continue to be a prevalent way of managing communications at a workplace. Instant messaging chat session may improve operational efficiencies, as they allow network users to collaborate and communicate freely around the world with minimal or no cost.

Unfortunately, instant messaging sessions may be unwelcomed interruptions at certain times, as they require a user to shift focus away from the current task they are working on (which may adversely impact productivity). Additionally, the unwelcomed nature of these interruptions may be intensified when a user is executing other applications (e.g., web conferencing applications that share a desktop or Microsoft PowerPoint™ in a "presentation" mode), wherein the interruption may be visible to all participants involved.

SUMMARY OF DISCLOSURE

In a first implementation, a method includes determining that a user of a client electronic device is in do-not-interrupt mode. A message directed to the user is routed to a client-based storage queue for subsequent delivery.

One or more of the following features may be included. The message may be an instant message. Routing a message directed to the user to a client-based storage queue for subsequent delivery may include storing the instant message in an instant message client-based storage queue.

The message may be a text message. Routing a message directed to the user to a client-based storage queue for subsequent delivery may include storing the text message in a text message client-based storage queue.

The message may be a voicemail message. Routing a message directed to the user to a client-based storage queue for subsequent delivery may include storing the voicemail message in a voicemail message client-based storage queue.

The message may be an email message. Routing a message directed to the user to a client-based storage queue for subsequent delivery may include storing the email message in an inbox of an email system.

A sender of the message directed to the user may be notified that the user of the client electronic device is in do-not-interrupt mode. Notifying a sender may include one or more of: generating a notification instant message and providing the notification instant message to the sender of the message directed to the user; generating a notification text message and providing the notification text message to the sender of the message directed to the user; generating a notification email message and providing the notification email message to the sender of the message directed to the user; and generating a notification voice mail message and providing the notification voice mail message to the sender of the message directed to the user.

If it is determined that the user of the client electronic device is no longer in do-not-interrupt mode, one or more messages stored in the client-based storage queue may be retrieved, thus defining one or more retrieved messages. The one or more retrieved messages may be provided to the user.

The rendering of an onscreen indicator associated with the message directed to the user may be prohibited while the user is in do-not-interrupt mode. The onscreen indicator may be chosen from the group consisting of: a text message received onscreen indicator; an instant message received onscreen indicator; and an email received onscreen indicator.

In another implementation, a computer program product resides on a computer readable medium that has a plurality of instructions stored on it. When executed by a processor, the instructions cause the processor to perform operations including determining that a user of a client electronic device is in do-not-interrupt mode. A message directed to the user is routed to a client-based storage queue for subsequent delivery.

One or more of the following features may be included. The message may be an instant message. Routing a message directed to the user to a client-based storage queue for subsequent delivery may include storing the instant message in an instant message client-based storage queue.

The message may be a text message. Routing a message directed to the user to a client-based storage queue for subsequent delivery may include storing the text message in a text message client-based storage queue.

The message may be a voicemail message. Routing a message directed to the user to a client-based storage queue for subsequent delivery may include storing the voicemail message in a voicemail message client-based storage queue.

The message may be an email message. Routing a message directed to the user to a client-based storage queue for subsequent delivery may include storing the email message in an inbox of an email system.

A sender of the message directed to the user may be notified that the user of the client electronic device is in do-not-interrupt mode. Notifying a sender may include one or more of: generating a notification instant message and providing the notification instant message to the sender of the message directed to the user; generating a notification text message and providing the notification text message to the sender of the message directed to the user; generating a notification email message and providing the notification email message to the sender of the message directed to the user; and generating a notification voice mail message and providing the notification voice mail message to the sender of the message directed to the user.

If it is determined that the user of the client electronic device is no longer in do-not-interrupt mode, one or more messages stored in the client-based storage queue may be retrieved, thus defining one or more retrieved messages. The one or more retrieved messages may be provided to the user.

The rendering of an onscreen indicator associated with the message directed to the user may be prohibited while the user is in do-not-interrupt mode. The onscreen indicator may be chosen from the group consisting of: a text message received onscreen indicator; an instant message received onscreen indicator; and an email received onscreen indicator.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

Figure 1:
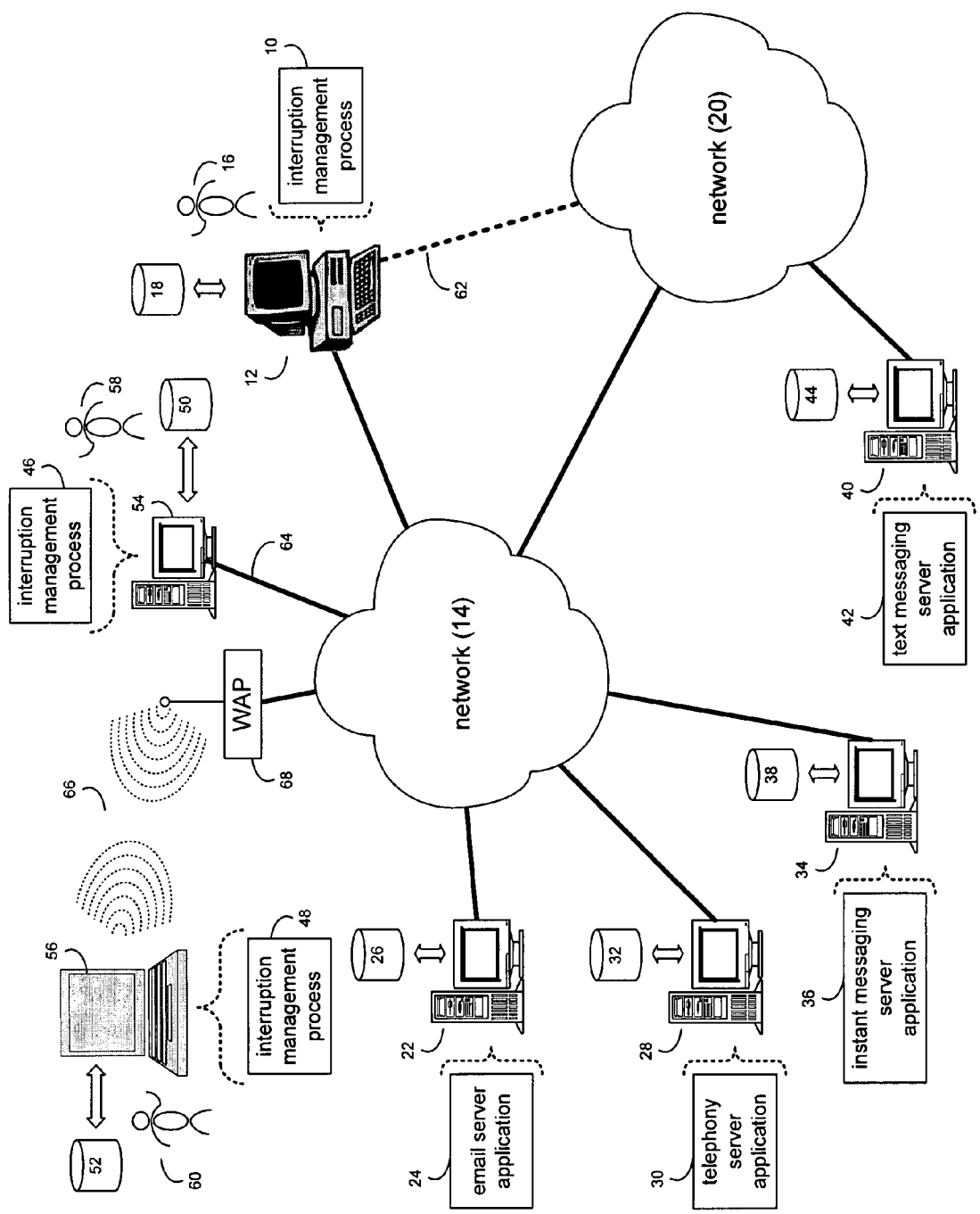
FIG. 1 is a diagrammatic view of a plurality of interruption management processes coupled to a distributed computing network.

System Overview:

Referring to FIG. 1, there is shown interruption management process 10 that may reside on and may be executed by client electronic device 12, which may be connected to network 14 (e.g., the Internet or a local area network). Examples of client electronic device 12 may include, but are not limited to: a personal computer, a laptop computer, a personal digital assistant, a notebook computer, a data-enabled, cellular telephone, and a dedicated network device, for example. Client electronic device 12 may execute an operating system, examples of which may include but are not limited to: Microsoft Windows™, Microsoft Windows CE™, Redhat Linux™, or a custom operating system.

As will be discussed below in greater detail, interruption management process 10 may determine that user 16 of client electronic device 12 is in do-not-interrupt mode and may route messages directed to the user to a client-based storage queue for subsequent delivery.

The instruction sets and subroutines of interruption management process 10, which may be stored on storage device 18 coupled to client electronic device 12, may be executed by one or more processors (not shown) and one or more memory architectures (not shown) incorporated into client electronic device 12. Storage device 18 may include but is not limited to: a hard disk drive; a tape drive; an optical drive; a RAID array; a random access memory (RAM); a read-only memory (ROM), a compact flash (CF) storage device, a secure digital (SD) storage device, and a memory stick storage device.

Network 14 may be connected to one or more secondary networks (e.g., network 20), examples of which may include but are not limited to: a local area network; a wide area network; or an intranet, for example.

One or more server computers may be coupled to network 14 (or network 20) and may perform various functions. For example, email server computer 22 may execute email server application 24 (e.g., Lotus Domino™ and Microsoft Exchange™ Server), the instruction sets and subroutines of which may be stored on storage device 26 coupled to email server computer 24. These instruction sets and subroutines may be executed by one or more processors (not shown) and one or more memory architectures (not shown) incorporated into email server computer 22. Storage device 26 may include but is not limited to: a hard disk drive; a tape drive; an optical drive; a RAID array; a random access memory (RAM); and a read-only memory (ROM).

Telephony server computer 28 may execute telephony server application 30 (e.g., 3COM IP Telephony™ and Cisco IP Telephony™), the instruction sets and subroutines of which may be stored on storage device 32 coupled to telephony server computer 28. These instruction sets and subroutines may be executed by one or more processors (not shown) and one or more memory architectures (not shown) incorporated into telephony server computer 28. Storage device 32 may include but is not limited to: a hard disk drive; a tape drive; an optical drive; a RAID array; a random access memory (RAM); and a read-only memory (ROM).

Instant messaging server computer 34 may execute instant messaging server application 36 (e.g., Lotus Sametime™ and Microsoft Live Communication Server™), the instruction sets and subroutines of which may be stored on storage device 38 coupled to instant messaging server computer 34. These instruction sets and subroutines may be executed by one or more processors (not shown) and one or more memory architectures (not shown) incorporated into instant messaging server computer 34. Storage device 38 may include but is not limited to: a hard disk drive; a tape drive; an optical drive; a RAID array; a random access memory (RAM); and a read-only memory (ROM).

Text messaging server computer 40 may execute text messaging server application 42 (e.g., Blackberry Enterprise Server™), the instruction sets and subroutines of which may be stored on storage device 44 coupled to text messaging server computer 40. These instruction sets and subroutines may be executed by one or more processors (not shown) and one or more memory architectures (not shown) incorporated into text messaging server computer 40. Storage device 44 may include but is not limited to: a hard disk drive; a tape drive; an optical drive; a RAID array; a random access memory (RAM); and a read-only memory (ROM).

Additional client electronic devices may also execute a copy of the interruption management process. For example, the instruction sets and subroutines of interruption management processes 46, 48, which may be stored on storage devices 50, 52 (respectively) coupled to client electronic devices 54, 56 (respectively), may be executed by one or more processors (not shown) and one or more memory architectures (not shown) incorporated into client electronic devices 54, 56 (respectively). As will be discussed below in greater detail, interruption management processes 46, 48 may determine that a user of client electronic devices 54, 56 (respectively) is in do-not-interrupt mode and may route messages directed to the user to a client-based storage queue for subsequent delivery.

Client electronic devices 54, 56 may each execute an operating system, examples of which may include but are not limited to Microsoft Windows™, Microsoft Windows CE™, Redhat Linux™, or a custom operating system.

Examples of storage devices 50, 52 may include but are not limited to: hard disk drives; tape drives; optical drives; RAID arrays; random access memories (RAM); read-only memories (ROM), compact flash (CF) storage devices, secure digital (SD) storage devices, and memory stick storage devices. Examples of client electronic devices 54, 56 may include, but are not limited to, personal computer 54, laptop computer 56, a personal digital assistant (not shown), a notebook computer (not shown), a data-enabled, cellular telephone (not shown), and a dedicated network device (not shown), for example.

As will be discussed below in greater detail, interruption management processes 10, 46, 48 may allow users 16, 58, 60 (respectively) to define one or more rules that manage interruptions concerning e.g., email messages, telephone calls, instant messages, and text messages received during certain modes of operation of e.g., client electronic devices 12, 54, 56.

Client electronic device 12, personal computer 54, and laptop computer 56 may be coupled to e.g., server computers 22, 28, 34, 40 directly through network 14 or through secondary network 20. Further, client electronic device 12 may be coupled to network 14 through secondary network 20, as illustrated with phantom link line 62.

The various client electronic devices may be directly or indirectly coupled to network 14 (or network 20). For example, personal computer 54 is shown directly coupled to network 14 via hardwired network connection 64. Laptop computer 56 is shown wirelessly coupled to network 14 via wireless communication channel 66 established between laptop computer 56 and wireless access point (i.e., WAP) 68, which is shown directly coupled to network 14. WAP 68 may be, for example, an IEEE 802.11a, 802.11b, 802.11g, Wi-Fi, and/or Bluetooth device that is capable of establishing wireless communication channel 66 between laptop computer 56 and WAP 68.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

The Interruption Management Processes:

As discussed above, interruption management processes 10, 46, 48 may allow users 16, 58, 60 (respectively) to define one or more rules that manage interruptions concerning e.g., email messages, telephone calls, instant messages, and text messages received during certain modes of operation of e.g., client electronic device 12, personal computer 54, and laptop computer 56.

Interruption management plays an important role with respect to productivity. And as interruptions are minimized, productivity may increase. Examples of interruptions may include, but are not limited to: receiving email messages, receiving telephone calls, receiving instant messages, and receiving text messages. Further, interruptions during the occurrence of certain events may be more intrusive than during other times. For example, receiving a telephone call while in the middle of a meeting or a presentation may be highly intrusive. Further, as certain events result in popup windows being rendered on e.g., the display screen of client electronic device 12, in the event that user 16 is given a network-based presentation on client electronic device 12 (or sharing the display screen of client electronic device 12), the rendering of a popup window (e.g., indicating the receipt of an email or an instant message) on the display screen of client electronic device 12 may result in that popup window being displayed to all of the viewers of the network-based presentation.

Figure 2:
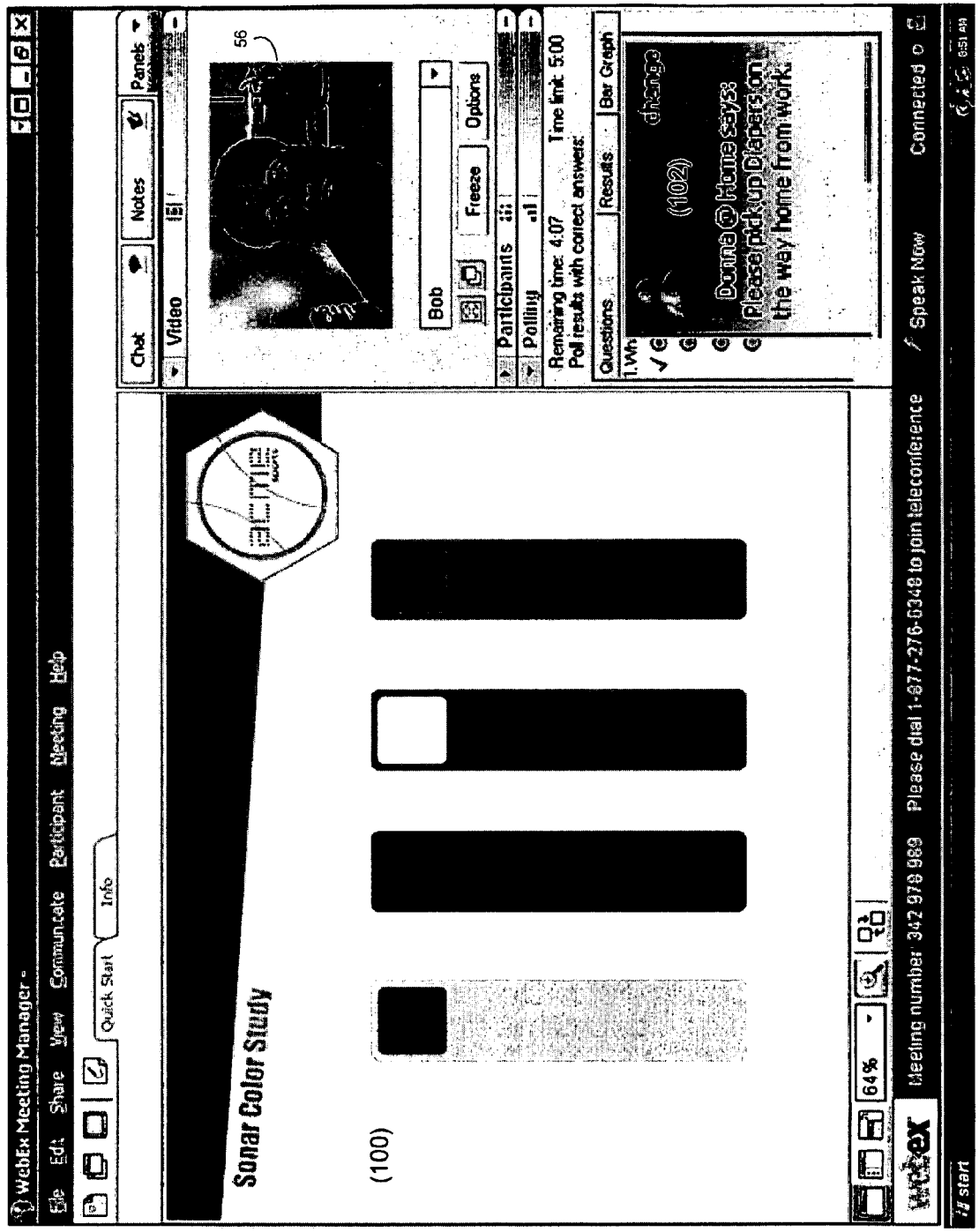
FIG. 2 is a diagrammatic view of a desktop sharing application and an onscreen indicator rendered by e.g., the instant messaging server application of FIG. 1.

For example and referring also to FIG. 2, assume that user 16 is running a desktop sharing application (e.g. WebEx™) to give a presentation to a plurality of coworkers on a project team. Further, assume that during the presentation, the wife of user 16 sends an instant message to user 16 asking user 16 to "Please pick up Diapers on the way home from work". The instant messaging program used by user 16 may render an on-screen indicator 102 concerning the instant message sent to user 16. As user 16 is in presentation mode, on-screen indicator 102 may be broadcast to all members of the project team.

Additionally, user 16 may experience other types of onscreen interruptions. For example, if user 16 receives an email message, a visual indicator (not shown) concerning the e-mail message sent to user 16 may be rendered on the screen of client electronic device 12 and broadcast to all members of the project team. Further, if user 16 receives a text message, a visual indicator (not shown) concerning the text message sent to user 16 may be rendered on the screen of client electronic device 12 and broadcast to all members of the project team. Additionally, if user 16 receives a voice phone call in the office from which user 16 is performing the presentation and if user 16 is transmitting audio, the ringing of the telephone (not shown) within the office of user 16 may be broadcast to all members of the project team.

Accordingly, it is desirable to minimize the amount of interruptions that occur while the user of a client electronic device is performing certain operations, such as giving presentations to team members.

Figure 3:
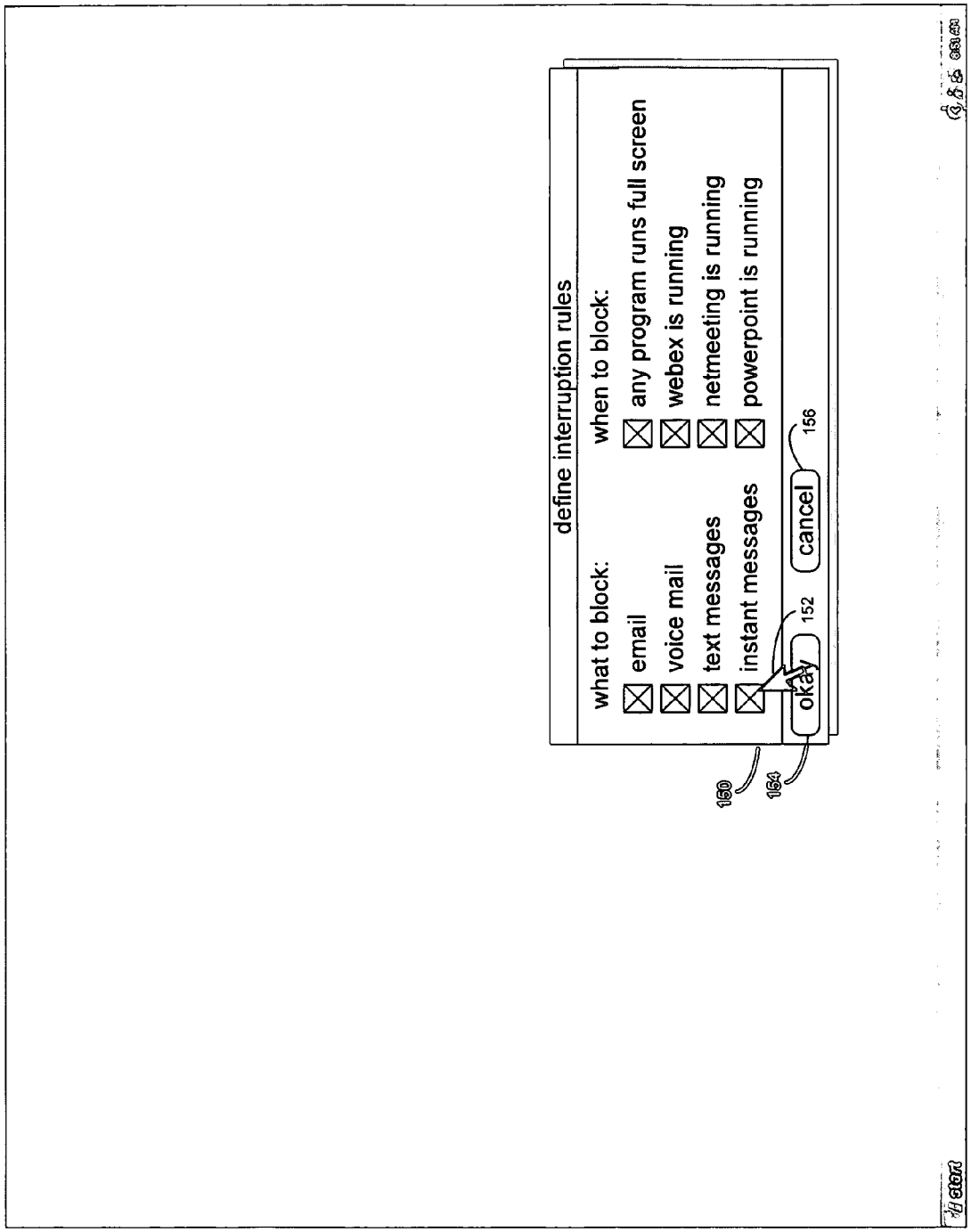
FIG. 3 is a diagrammatic view of a configuration window for one of the interruption management processes of FIG. 1.

Referring also to FIG. 3, users of various client electronic devices (such as user 16 of client electronic device 12, user 58 of personal computer 54, and user 60 of laptop computer 56) may utilize interruption management processes 16, 46, 48 (respectively) to configure what (if any) interruptions are allowed while the user of the client electronic device is performing certain functions.

While the following discussion is limited to interruption management process 10 executed on client electronic device 12, this is for illustrative purposes only and is not intended to be a limitation of this disclosure, as the following discussions may be equally applied to interruption management process 46 executed on personal computer 54 and interruption management process 48 executed on laptop computer 56.

Interruption management process 10 may render configuration window 150 on the display screen of client electronic device 12, which allows user 16 to configure the manner in which interruption management process 10 operates. Configuration window 150 of interruption management process 10 may allow user 16 to define what particular interruptions they wish to block and when they wish to block these particular interruptions.

For example, configuration window 150 is shown to include, under the heading "what to block", four selectable entries namely: "e-mail"; "voicemail"; "text messages"; and "instant messages". Accordingly, if user 16 does not wish to be interrupted with instant messages when performing presentations, user 16 may simply select the selectable box next to the "instant messages" entry using onscreen pointer 152 which is controllable by a pointing device (e.g. a mouse; not shown).

Additionally, configuration window 150 is shown to include, under the heading "when to block" four selectable entries namely: "any program runs full screen"; "WebEx is running"; "NetMeeting is running"; and "PowerPoint is running". Accordingly, if user 16 does not wish to be interrupted when WebEx is running, user 16 may simply select the selectable box next to the "WebEx is running" entry using onscreen pointer 152 which is controllable by a pointing device (e.g. a mouse; not shown).

While configuration window 150 is shown to include four entries concerning "what to block" and four entries concerning "when to block", this is for illustrative purposes only and is not intended to be a limitation of this disclosure. Specifically, the exact number of entries under "what to block" and/or the exact number of entries under "when to block" may be adjusted based upon e.g. design criteria and program capabilities.

Assume for illustrative purposes that user 16 wants to minimize the amount of interruptions that are experienced during as many situations as possible. Accordingly, user 16 may choose to select all entries under "what to block" and may choose to select all entries under "when to block" (as shown in FIG. 3). Once user 16 has selected all the appropriate entries, user 16 may select "okay" button 154 using onscreen pointer 152. Alternatively, user 16 may select "cancel" button 156 to close configuration window 150.

Assuming the user 16 selects "okay" button 154 using onscreen pointer 152, interruption management process 10 may be configured to block the specific interruption types during the specific times defined by user 16.

Once properly configured, interruption management process 10 may manage the amount of times user 16 is interrupted by managing the specific types of interruptions that are allowed and the specific times during which these interruptions are allowed. Interruption management process 10 may determine 200 whether or not user 16 is operating client electronic device 12 in do-not-interrupt mode. Do-not-interrupt mode may be defined as the computer operating during one of the above-described times during which interruption should be blocked.

Figure 4:
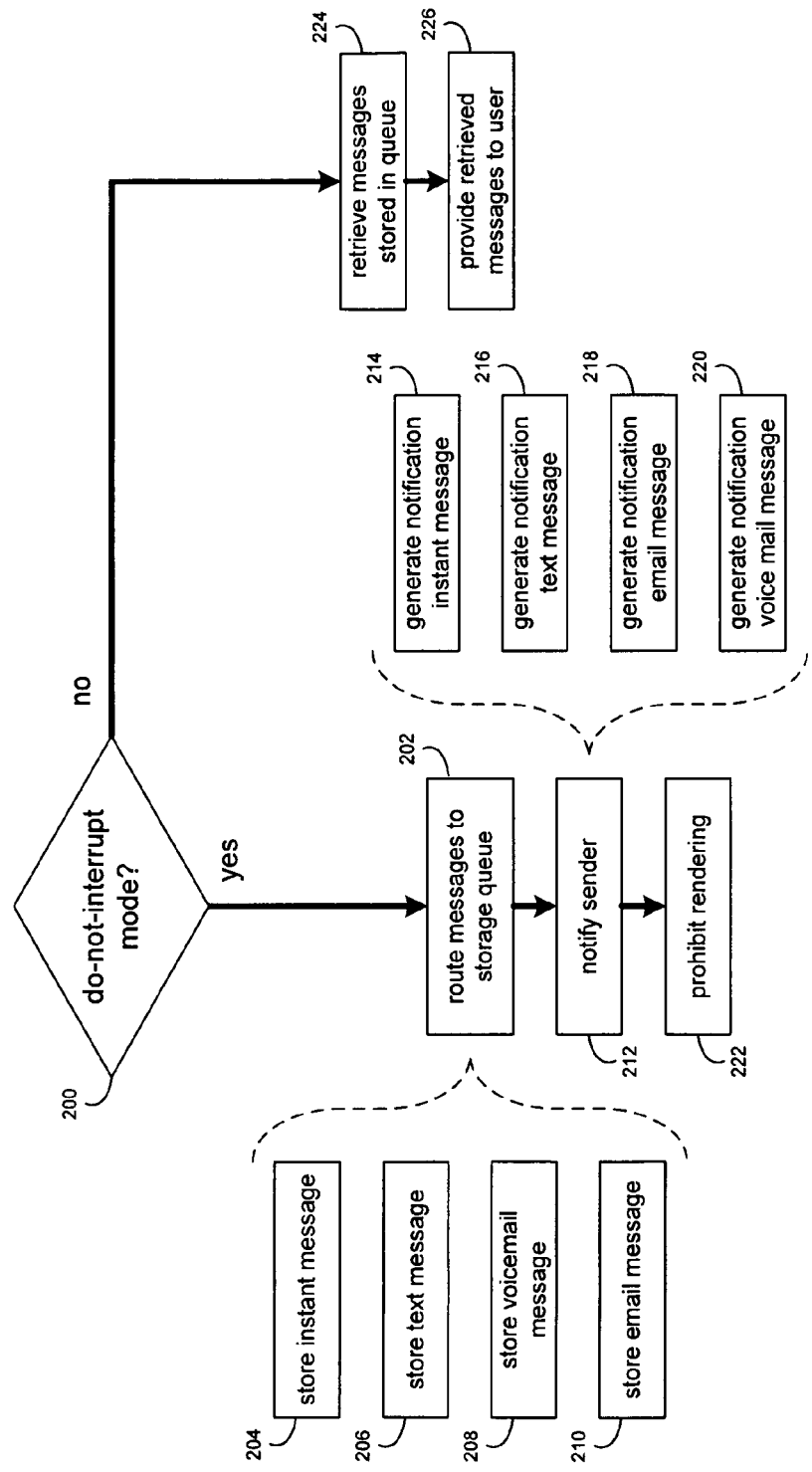
FIG. 4 is a flowchart of one of the interruption management processes of FIG. 1.

Continuing with the above-stated example, user 16 does not wish to be interrupted when: "any program runs full screen"; "WebEx is running"; "NetMeeting is running"; and "PowerPoint is running". Accordingly and referring also to FIG. 4, interruption management process 10 may monitor the operation of client electronic device 12 to determine 200 if client electronic device 12 is operating in one of the above-described four modes (i.e., operating in do-not-interrupt mode). If it is determined 200 that client electronic device 12 is operating in do-not-interrupt mode, interruption management process 10 may route 202 messages that meet the criteria defined within configuration window 150 to a client-based storage queue for subsequent delivery. The specific type of client-based storage queue to which the messages are routed 202 will vary depending on the type of message.

Continuing with the above-stated example, as user 16 wishes to have all interruptions (e.g. "e-mail"; "voicemail"; "text messages"; and "instant messages") blocked, all of these messages will be routed 202 to various client-based storage queues included within client electronic device 12. As discussed above, client electronic device 12 (i.e. the computer that executes interruption management process 10) may be coupled to server computers 22, 28, 34, 40 (i.e. the computers that execute e-mail server application 24, telephony server application 30, instant messaging server application 36 and text messaging server application 42). Accordingly, upon determining 200 that user 16 is in do-not-interrupt mode, interruption management process 10 may queue all messages received on client electronic device 12 to one or more client-based storage queues for subsequent delivery to user 16, thus preventing the interruption of user 16 while in do-not-interrupt mode.

Accordingly, when the message received by client electronic device 12 is an instant message, routing 202 the message to a client-based storage queue for subsequent delivery may include storing 204 the instant message in an instant message client-based storage queue controlled by interruption management process 10 and included within e.g. storage device 18 that is coupled to client electronic device 12. Therefore, in the event that client electronic device 12 is in do-not-interrupt mode at the time that an instant message for user 16 is received by client electronic device 12, interruption management process 10 may store 204 the instant message within an instant message client-based storage queue included within storage device 18 that is coupled to client electronic device 12 for subsequent delivery to user 16.

Further, when the message received by client electronic device 12 is a text message, routing 202 the message to a client-based storage queue for subsequent delivery may include storing 206 the text message in a text message client-based storage queue controlled by interruption management process 10 and included within e.g. storage device 18 that is coupled to client electronic device 12. Therefore, in the event that client electronic device 12 is in do-not-interrupt mode at the time that a text message for user 16 is received by client electronic device 12, interruption management process 10 may store 206 the text message within a text message client-based storage queue included within storage device 18 that is coupled to client electronic device 12 for subsequent delivery to user 16.

Additionally, when the message received by client electronic device 12 is a voicemail message, routing 202 the message to a client-based storage queue for subsequent delivery may include storing 208 the voicemail message in a voicemail message client-based storage queue controlled by interruption management process 10 and included within storage device 18 that is coupled to client electronic device 12. Therefore, in the event that client electronic device 12 is in do-not-interrupt mode at the time that a voice call for user 16 is received by client electronic device 12, interruption management process 10 may store 208 the voice call within a voicemail client-based storage queue included within storage device 18 that is coupled to client electronic device 12 for subsequent delivery to user 16.

Further, when the message received by client electronic device 12 is an email message, routing 202 the message to a client-based storage queue for subsequent delivery may include storing 210 the email message in an inbox of an email system controlled by interruption management process 10 and included within storage device 18 that is coupled to client electronic device 12. Therefore, in the event that client electronic device 12 is in do-not-interrupt mode at the time that an e-mail message for user 16 is received by client electronic device 12, interruption management process 10 may store 210 the e-mail message within an e-mail message client-based storage queue included within storage device 18 that is coupled to client electronic device 12 for subsequent delivery to user 16.

In the event that a message is queued by interruption management process 10 for subsequent delivery to e.g. user 16, the sender of the message may be notified 212 that user 16 is in do-not-interrupt mode.

For example, if the message received is an instant message, notifying 212 the sender of the instant message may include generating 214 a notification instant message and providing the notification instant message to the sender of the instant message that was directed to user 16, informing the sender that user 16 is in do-not-interrupt mode. Accordingly, the sender of the instant message may receive a reply instant message that says "The intended recipient of this instant message cannot be interrupted now but, as this message is being stored for later review, will respond to this message as soon as possible".

Further, if the message received is a text message, notifying 212 the sender of the text message may include generating 216 a notification text message and providing the notification text message to the sender of the text message that was directed to user 16, informing the sender that user 16 is in do-not-interrupt mode. Accordingly, the sender of the text message may receive a reply text message that says "The intended recipient of this text message cannot be interrupted now but, as this message is being stored for later review, will respond to this message as soon as possible".

Additionally, if the message received is an email message, notifying 212 the sender of the email message may include generating 218 a notification email message and providing the notification email message to the sender of the email message directed to user 16, informing the sender that user 16 is in do-not-interrupt mode. Accordingly, the sender of the email message may receive a reply email message that says "The intended recipient of this email message cannot be interrupted now but, as this message is being stored for later review, will respond to this message as soon as possible".

Further, if the message received is a voice call, notifying 212 the sender of the voice call may include generating a notification voice mail message and providing the notification voice mail message to the sender of the message directed to user 16, informing the sender that user 16 is in do-not-interrupt mode. Accordingly, the sender of the voice call may be immediately directed to a voice mail system which may say "The intended recipient of this voice call cannot be interrupted now but please leave a voice mail message and they will respond to your message as soon as possible".

Accordingly, through the use of interruption management process 10, user 16 may prohibit 222 the rendering of onscreen indicators (e.g., text message received onscreen indicators; instant message received onscreen indicators; and email received onscreen indicators) associated with the messages (e.g. instant messages, text messages, and e-mail messages) directed toward user 16 while user 16 is in do-not-interrupt mode (as defined above).

As discussed above, interruption management process 10 may monitor the operation of client electronic device 12 to determine 200 if client electronic device 12 is operating in do-not-interrupt mode, such that do-not-interrupt mode may be defined as the computer operating in one of the above-described manners during which interruptions should be blocked. Accordingly, when interruption management process 10 determines that user 16 is not operating client electronic device 12 in do-not-interrupt mode, interruption management process 10 may once again allow the rendering of onscreen indicators (e.g., text message received onscreen indicators; instant message received onscreen indicators; and email received onscreen indicators) associated with the messages (e.g. instant messages, text messages, and e-mail messages) directed toward user 16.

Further and as discussed above, messages that meet the criteria defined above (via configuration window 150) are routed 202 to a client-based storage queue for subsequent delivery to user 16. Accordingly, once it is determined 200 that client electronic device 12 is no longer operating in do-not-interrupt mode, one or more messages stored in the above-described client-based storage queue may be retrieved 224, and these retrieved messages may be provided 226 to the user.

For example, once client electronic device 12 is no longer operating in do-not-interrupt mode, the instant messages stored 204 within instant message client-based storage queue (i.e., which is controlled by interruption management process 10 and included within e.g. storage device 18) may be retrieved 224 from the instant message client-based storage queue and provided 226 to user 16, thus allowing user 58 to e.g. respond to the instant messages received while in do-not-interrupt mode.

Further, once client electronic device 12 is no longer operating in do-not-interrupt mode, the text messages stored 206 within text message client-based storage queue (i.e., which is controlled by interruption management process 10 and included within e.g. storage device 18) may be retrieved 224 from the text message client-based storage queue and provided 226 to user 16, thus allowing user 16 to e.g. respond to the text messages received while in do-not-interrupt mode.

Additionally, once client electronic device 12 is no longer operating in do-not-interrupt mode, the voice mail messages stored 208 within voice mail message client-based storage queue (i.e., which is controlled by interruption management process 10 and included within e.g. storage device 18) may be retrieved 224 from the voice mail client-based storage queue and provided 226 to user 16, thus allowing user 16 to e.g. respond to the voice mail messages received while in do-not-interrupt mode.

Further, once client electronic device 12 is no longer operating in do-not-interrupt mode, the email messages stored 210 within email message client-based storage queue (i.e., which is controlled by interruption management process 10 and included within e.g. storage device 18) may be retrieved 224 from the email message client-based storage queue and provided 226 to user 16, thus allowing user 16 to e.g. respond to the email messages received while in do-not-interrupt mode.

A number of implementations have been described. Nevertheless, it will be understood that various modifications may be made. Accordingly, other implementations are within the scope of the following claims.

What is claimed is:

1. A method for client-side interruption management, the method comprising:
   configuring, via a configuration window, one or more rules associated with a user for a do-not-interrupt mode;
   initiating the do-not-interrupt mode responsive to the one or more configured rules;
   launching a desktop sharing application configured, at least in part, to broadcast, via a network, a display screen of a client electronic device associated with the user to a plurality of other display screens of other client electronic devices associated with other users, wherein the one or more configured rules is configured to initiate the do-not-interrupt mode responsive to launching the desktop sharing application;
   blocking a message directed to the user of the client electronic device responsive to the do-not-interrupt mode;
   routing, via the client electronic device, the message directed to the user to a client-based storage queue for subsequent delivery; and
   delivering the message directed to the user from the client-based storage queue responsive to the user of the client electronic device no longer in the do-not-interrupt mode.

2. The method of claim 1 wherein the message is an instant message and routing the message directed to the user to the client-based storage queue for subsequent delivery includes:
   storing the instant message in an instant message client-based storage queue.

3. The method of claim 1 wherein the message is a text message and routing the message directed to the user to the client-based storage queue for subsequent delivery includes:
   storing the text message in a text message client-based storage queue.

4. The method of claim 1 wherein the message is a voicemail message and routing the message directed to the user to the client-based storage queue for subsequent delivery includes:
   storing the voicemail message in a voicemail message client-based storage queue.

5. The method of claim 1 wherein the message is an email message and routing the message directed to the user to the client-based storage queue for subsequent delivery includes:
   storing the email message in an inbox of an email system.

6. The method of claim 1 further comprising:
   notifying a sender of the message directed to the user that the user of the client electronic device is in do-not-interrupt mode.

7. The method of claim 6 wherein notifying a sender includes one or more of:

generating a notification instant message and providing the notification instant message to the sender of the message directed to the user;

generating a notification text message and providing the notification text message to the sender of the message directed to the user;

generating a notification email message and providing the notification email message to the sender of the message directed to the user; and generating a notification voice mail message and providing the notification voice mail message to the sender of the message directed to the user.

8. The method of claim 1 further comprising:

determining that the user of the client electronic device is no longer in do-not-interrupt mode;

retrieving one or more messages stored in the client-based storage queue, thus defining one or more retrieved messages; and providing the one or more retrieved messages to the user.

9. The method of claim 1 further comprising:

prohibiting the rendering of an onscreen indicator associated with the message directed to the user while the user is in do-not-interrupt mode.

10. The method of claim 9 wherein the onscreen indicator is chosen from the group consisting of: a text message received onscreen indicator; an instant message received onscreen indicator; and an email received onscreen indicator.

11. A computer program product for client-side interruption management, the computer program product residing on a computer readable medium having a plurality of instructions stored thereon which, when executed by a processor, cause the processor to perform operations comprising:

configuring, via a configuration window, one or more rules associated with a user for a do-not-interrupt mode;

launching a desktop sharing application configured, at least in part, to broadcast, via a network, a display screen of a client electronic device associated with the user to a plurality of other display screens of other client electronic devices associated with other users, wherein the one or more configured rules is configured to initiate the do-not-interrupt mode responsive to launching the desktop sharing application;

initiating the do-not-interrupt mode responsive to the one or more configured rules;

blocking a message directed to the user of the client electronic device responsive to the do-not-interrupt mode;

routing, via the client electronic device, the message directed to the user to a client-based storage queue for subsequent delivery; and delivering the message directed to the user from the client-based storage queue responsive to the user of the client electronic device no longer in the do-not-interrupt mode.

12. The computer program product of claim 11 wherein the message is an instant message and the instructions for routing the message directed to the user to the client-based storage queue for subsequent delivery include instructions for:

storing the instant message in an instant message client-based storage queue.

13. The computer program product of claim 11 wherein the message is a text message and the instructions for routing the message directed to the user to the client-based storage queue for subsequent delivery include instructions for:

storing the text message in a text message client-based storage queue.

14. The computer program product of claim 11 wherein the message is a voicemail message and the instructions for routing the message directed to the user to the client-based storage queue for subsequent delivery include instructions for:

storing the voicemail message in a voicemail message client-based storage queue.

15. The computer program product of claim 11 wherein the message is an email message and the instructions for routing the message directed to the user to the client-based storage queue for subsequent delivery include instructions for:

storing the email message in an inbox of an email system.

16. The computer program product of claim 11 further comprising instructions for:

notifying a sender of the message directed to the user that the user of the client electronic device is in do-not-interrupt mode.

17. The computer program product of claim 16 wherein the instructions for notifying a sender includes instructions for one or more of:

generating a notification instant message and providing the notification instant message to the sender of the message directed to the user;

generating a notification text message and providing the notification text message to the sender of the message directed to the user;

generating a notification email message and providing the notification email message to the sender of the message directed to the user; and generating a notification voice mail message and providing the notification voice mail message to the sender of the message directed to the user.

18. The computer program product of claim 11 further comprising instructions for:

determining that the user of the client electronic device is no longer in do-not-interrupt mode;

retrieving one or more messages stored in the client-based storage queue, thus defining one or more retrieved messages; and providing the one or more retrieved messages to the user.

19. The computer program product of claim 11 further comprising instructions for:

prohibiting the rendering of an onscreen indicator associated with the message directed to the user while the user is in do-not-interrupt mode.

20. The computer program product of claim 19 wherein the onscreen indicator is chosen from the group consisting of: a text message received onscreen indicator; an instant message received onscreen indicator; and an email received onscreen indicator.

* * * * *